US006388730B1

(12) United States Patent
Lindquist

(10) Patent No.: US 6,388,730 B1
(45) Date of Patent: May 14, 2002

(54) LATERAL FIELD BASED LIQUID CRYSTAL ELECTRO-OPTIC POLARIZER

(75) Inventor: Robert G. Lindquist, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/443,994

(22) Filed: Nov. 19, 1999

(51) Int. Cl.$^7$ .................................................. B02F 1/13
(52) U.S. Cl. ...................................... 349/200; 359/273
(58) Field of Search ............................... 349/141, 200, 349/201, 130; 359/559, 573

(56) References Cited

U.S. PATENT DOCUMENTS

| | | | |
|---|---|---|---|
| 3,843,231 A | * 10/1974 | Borel et al. .................. | 349/202 |
| 4,364,639 A | 12/1982 | Sinclair et al. | |
| 4,378,490 A | 3/1983 | d'Auria Luigi | |
| 4,697,869 A | 10/1987 | So et al. | |
| 4,790,634 A | 12/1988 | Miller et al. | |
| 4,797,694 A | 1/1989 | Agostinelli et al. | |
| 4,856,869 A | * 8/1989 | Sakata et al. ............... | 349/201 |
| 4,904,044 A | 2/1990 | Tamulevich | |
| 4,989,938 A | 2/1991 | Tamulevich | |
| 5,015,057 A | 5/1991 | Rumbaugh et al. | |
| 5,126,869 A | * 6/1992 | Lipchak et al. ............. | 349/202 |
| 5,699,468 A | 12/1997 | Farries et al. | |
| 5,883,687 A | * 3/1999 | Lu et al. ..................... | 349/201 |
| 5,963,291 A | 10/1999 | Wu et al. | |
| 5,986,740 A | * 11/1999 | Robinson et al. ........... | 349/201 |

FOREIGN PATENT DOCUMENTS

| | | |
|---|---|---|
| EP | 0821251 A2 | 6/1997 |
| EP | 0821251 A3 | 6/1997 |
| WO | WO 99/04311 | 7/1998 |
| WO | 99/50978 | 10/1999 |

OTHER PUBLICATIONS

Nordin et al., "Liquid Crystal–On–Silicon Implementation Of The Partial Pixel Three–Dimensional Display Architecture", Applied Optics, vol. 34, No. 19, Jul. 1, 1995, pp. 3756–3763.

"High–resolution liquid–crystal phase grating formed by fringing fields interdigitated electrodes"; Lindquist et al, from Optics Letters, vol. 19, No. 9; May 1, 1994, pp. 670–672.

"Electrostatic and diffraction analysis of a liquid–crystal device utilizing fringing fields: applications to three–dimensional displays"; Kulick et al, from Applied Optics, vol. 34, No. 11; Apr. 10, 1995, pp. 1901–1922.

* cited by examiner

Primary Examiner—Kenneth Parker
(74) Attorney, Agent, or Firm—Juliana Agan

(57) ABSTRACT

An electro-optic polarizor, grating assembly or cell (10) includes a first glass plate (12) to form the foundation of the cell. A first alignment surfactant (14) is coated on one surface of the first glass plate (12). Similarly, a second alignment surfactant (24) is coated on one surface of a second glass plate (22). A transparent interdigitated electrode pattern (30) is disposed between the second glass plate (22) and the second alignment surfactant (24). A thin film of homeotropically aligned nematic liquid crystal (40) is sandwiched between the first and second alignment surfactants (14) and (24) for applying a lateral electric field caused by the control voltage or signal (50) across the liquid crystal (40) to alter the optical properties of the liquid crystal (40) such that a polarization depended grating (60) is induced by the lateral electric field (50).

13 Claims, 9 Drawing Sheets

LC Phase Gratings    Aperture

LATERAL FIELD BASED LIQUID CRYSTAL ELECTRO-OPTIC POLARIZER

BACKGROUND OF THE INVENTION

1. Field of the Invention

The present invention relates generally to electro-optic polarizors, and particularly to electro-optic polarizors for use in optical communications systems, such as a variable optical attenuator (VOA), a dynamic gain flattening device or other optical components.

2. Technical Background

As one optical component example out of others used in a network, a variable optical attenuator (VOA) is one of the basic building blocks of an optical communications system. The VOA is used to reduce the power level of an optical signal in a tunable manner. The input optical power is higher than the output optical power by a factor of 1/k in which k is the variable attenuation coefficient and is varied by $V_S$ the control signal. The output optical power is thus proportional to the input optical power reduced by a factor of k. The magnitude of k is controlled by $V_S$ and is limited to the range from 0 to 1.

Several methods presently exist for implementing a VOA. The two most actively pursued include: opto-mechanical methods such as a moving blade or a variable neutral density filter; and electro-optic methods such as using traditional passive liquid crystal technology. The traditional liquid crystal based VOAs offer a low voltage, low cost advantage over the opto-mechanical devices but typically suffer from temperature effects, polarization dependent loss, when the removal of polarization from the different orthogonal coordinates are not equal, or unacceptable insertion losses due to the existence of separate polarizers. A dual polarization path system can be used to overcome these prior-art polarization deficiencies. However, an added cost is incurred for the addition of polarization splitters and combiners.

Most liquid crystal devices use transverse electric fields. In the transverse field the electric field lines extend from the first substrate to the second substrate of the liquid crystal (LC) material sandwiched in between.

In such traditional LC devices that use transverse fields, the resolution is limited to approximately five times the film thickness due to electrical crosstalk from the fringing field of adjacent electrodes. Therefore, a trade-off exists between resolution and useful LC film thickness. High quality structures are thus not likely for features or grating periods below 10 μm.

The alignment needed for the passively aligned transverse field LC device is homogeneous which is usually achieved by a complex rubbing process.

Therefore, there is a need for a simple, non-mechanical, low cost, low voltage, low power, high resolution, arrayable device or method to control polarization for use as an optical communication component, such as a multi-port VOA or a dynamic gain flattening device.

DETAILED DESCRIPTION OF THE PREFERRED EMBODIMENTS

Figure 1:
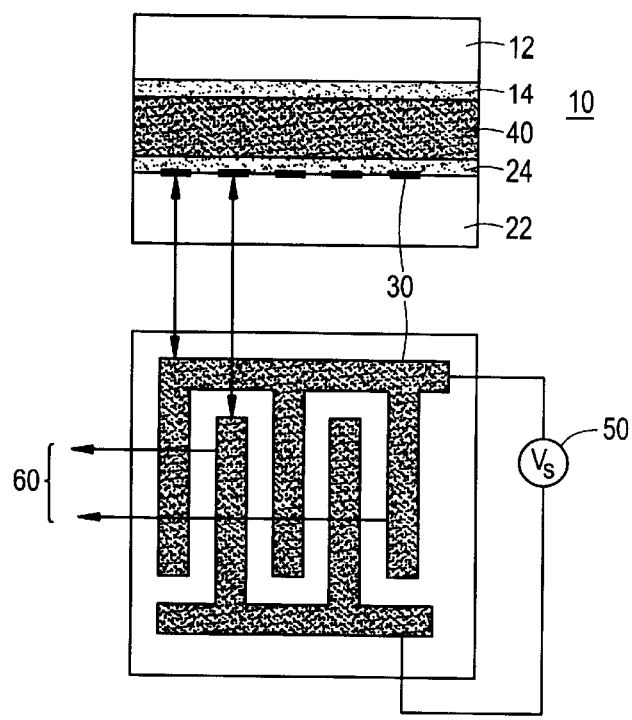
FIG. 1 is a cross-sectional and top view of a polarizor cell 10, in accordance with the teachings of the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the grating used as an electro-optic polarizor or cell of the present invention is designated generally throughout by reference numeral 10.

Figure 12:
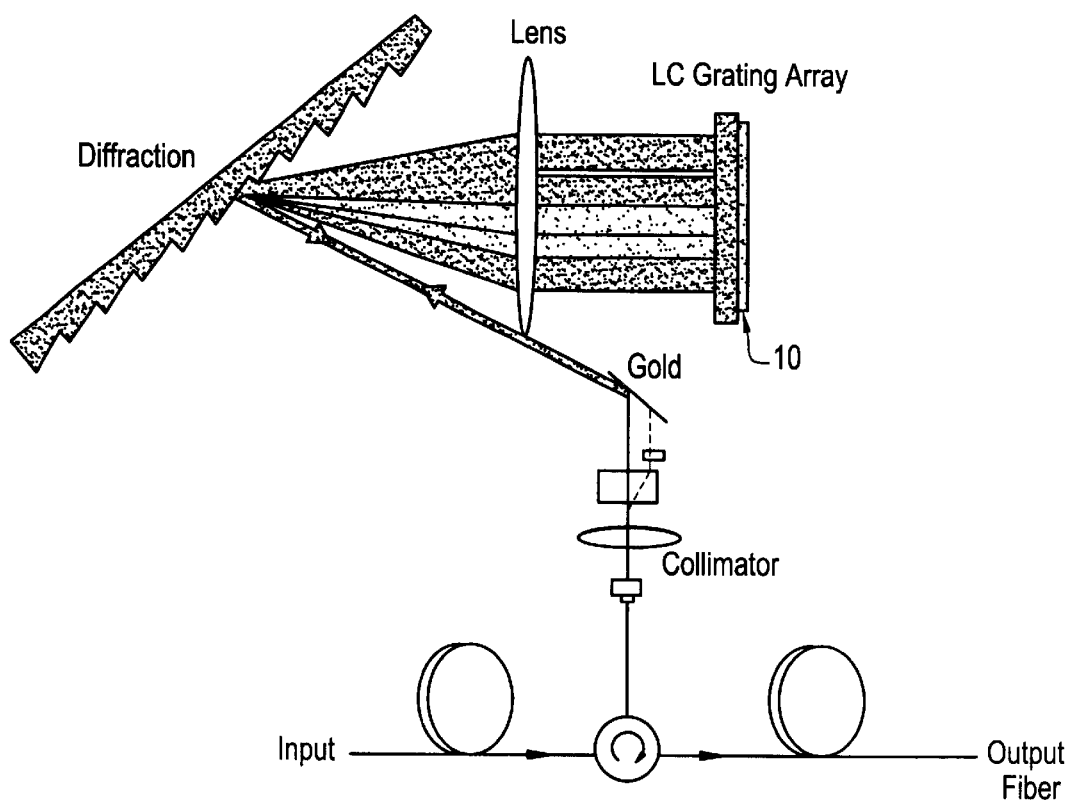
FIG. 12 is a use of an array of diffraction grating cells 10 of FIG. 1 on one substrate in a dynamic gain flattening application, in accordance with the teachings of the present invention.

Referring to FIG. 1, the basic structure of a lateral field based liquid crystal phase grating or grating assembly is shown as a cross-section and a top view of a cell. The cell or grating assembly can be used alone as an optical device, such as a polarizor or used with a plurality of cells, as in a VOA or arrayed with multiple cells to form arrayable optical devices, such as multi-port VOA's or cells 10 combined to form multipled VOA's on one substrate to form a dynamic gain flattening filter of FIG. 12. For example, multiple cells can be arrayed to form multiple VOA's on a single substrate for use as a liquid crystal cross-connect (LCX) or another optic device.

Referring to the cross-section view of the cell in FIG. 1, an electro-optic polarizor, grating assembly or cell 10 includes a first glass plate 12 to form the foundation of the cell. A first alignment surfactant 14 is coated on one surface of the first glass plate 12. Similarly, a second alignment surfactant 24 is coated on one surface of a second glass plate 22. A transparent interdigitated electrode pattern 30 is disposed between the second glass plate 22 and the second alignment surfactant 24. A thin film of homeotropically aligned nematic liquid crystal 40 is sandwiched between the first and second alignment surfactants 14 and 24 for applying a lateral electric field caused by the control voltage or signal 50 across the liquid crystal 40 to alter the optical properties of the liquid crystal 40 such that a polarization depended grating 60 is induced by the lateral electric field 50. Nematic represent a mesophase of a liquid crystal material. Homeotropically aligned means that the liquid crystal molecules are aligned perpendicular to the alignment surface.

Thus, according to the present invention, the homeotropically aligned film of nematic liquid crystalline material 40 is sandwiched between two glass plates 12 and 22, each coated with an alignment layer 14 and 24 to form a grating cell or assembly 10. Preferably, the interdigitated transparent electrode pattern 30 has electrodes fabricated from indium tin oxide (ITO). One of the glass plates 22 is coated with this electrode pattern 30 while the other plate 12 is not coated with the electrodes.

Figure 2:
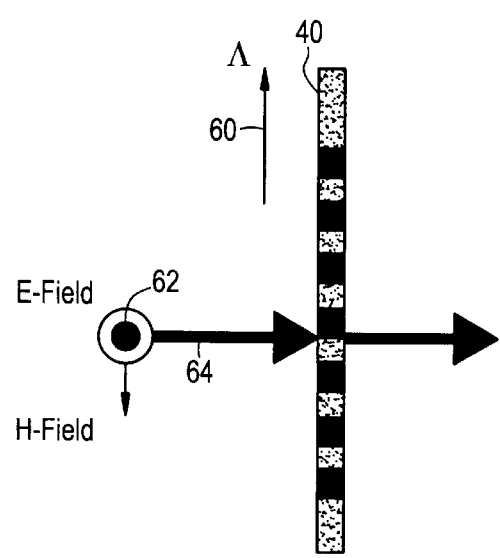
FIG. 2 is a side view of the cell 10 of FIG. 1 being hit by an ordinary ray.
Figure 3:
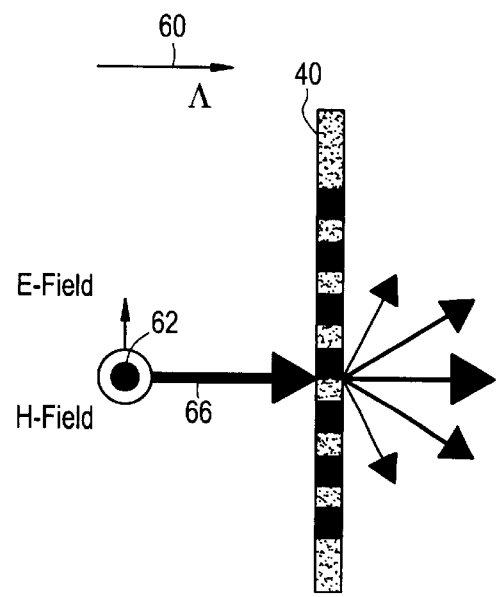
FIG. 3 is a side view of the cell 10 of FIG. 1 being hit by an extraordinary ray.

Referring to FIGS. 2 and 3, how the cell 10 of FIG. 1 provides attenuation through the diffraction is illustrated. The ordinary (FIG. 2) and extraordinary (FIG. 3) rays of a beam of light incident on the grating cell 10 of FIG. 1 is separately represented. As the optical beam of light 62 enters the liquid crystalline (LC) film 40, the optical beam 62 separates into two linear eigen-polarization states (ordinary ray and extraordinary ray) due to the uni-axial or nematic nature of the LC film 40. Because the refractive index for the ordinary ray 64, $n_o$, is independent of director axis orientation, the ordinary ray 64 sees no phase grating and passes through unaffected in FIG. 2. However, the extraordinary ray 66 in FIG. 3 has a refractive index, $n_e$, that is a function of director axis orientation. Thus, the extraordinary ray 66 sees a phase grating and is diffracted.

The amount of light diffracted in the extraordinary ray 66 is a function of grating strength. The grating strength is a controlled by the depth of penetration of the electric fields applied by the control signal 50 into the LC film 40 of FIG. 1. The depth of penetration is a function of the RMS voltage from the control signal 50 applied to the interdigitated electrodes 30. Thus, an applied waveform from the control signal 50 controls the grating strength in FIG. 3.

The present invention relies on a lateral field based liquid crystal phase grating of FIG. 1 to perform the function of an electro-optic phase grating needed in optical components, such as the VOA. The basic operating concept of grating structures can also find applications in 3D displays but their structures and applications in optical communications components are different.

Figure 4:
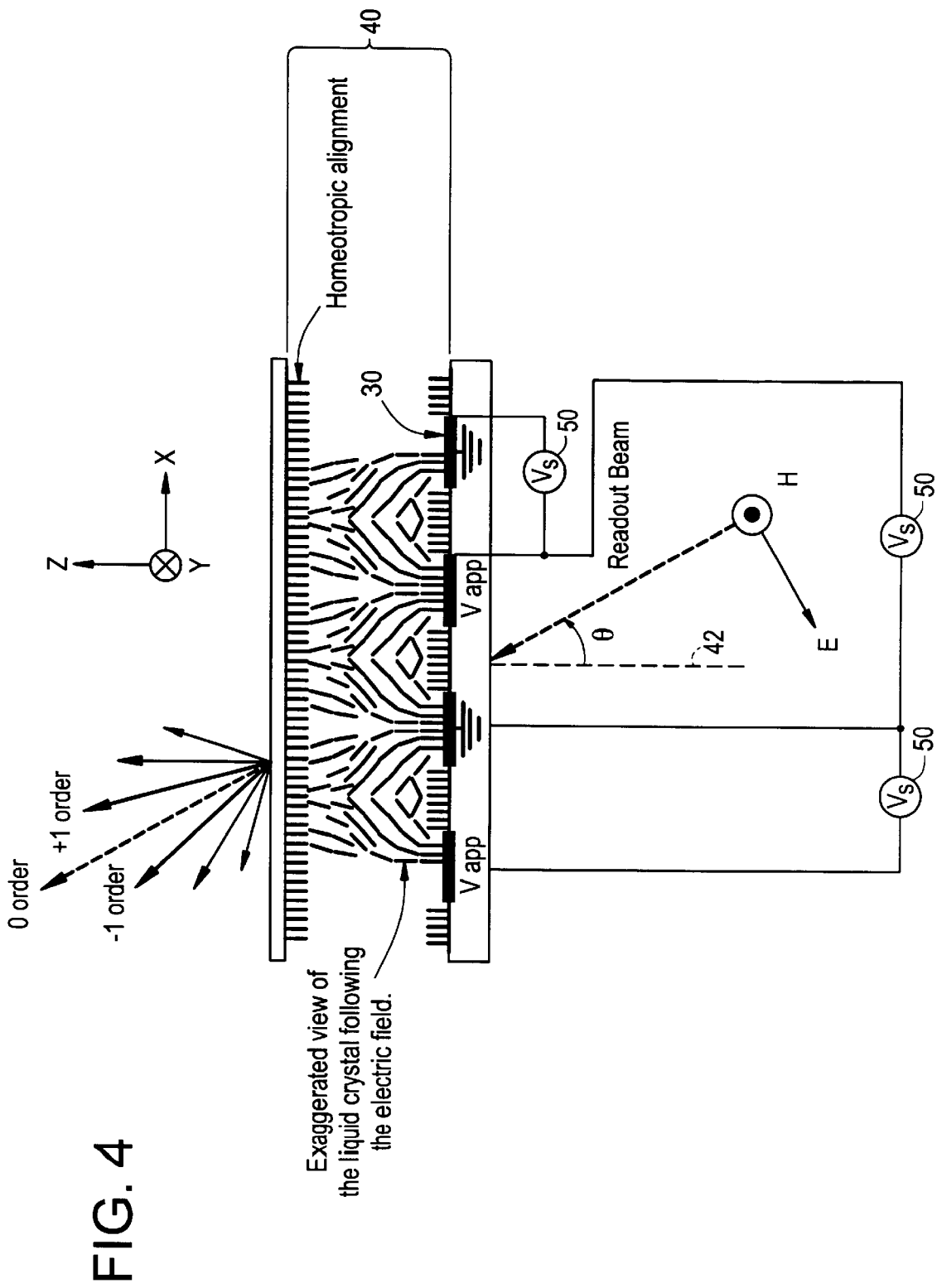
FIG. 4 is an exaggerated representation of a lateral electric induced grating by applying the control signal 50 to the cell 10 of FIG. 1.

Referring to FIG. 4, the formation of a phase grating in the thin film of a homeotropically aligned liquid crystal of FIG. 1 is illustrated. A spatially varying director-axis orientation is formed in the presence of the ac voltage or control signal 50 applied to the interdigitated electrodes 30. Ideally the liquid crystal 40 will tend to align its director axis along the field lines. Thus, the grating inducement of the electro-optic polarizor, lateral field based grating or cell 10 is based on the nature of the homeotropically aligned nematic liquid crystal film which includes rod-shaped molecules that rotate from the homeotropically aligned position of being perpendicular to the first and second alignment surfactants 14 and 24 of FIG. 1 to a geometry that follows the lateral electrostatic field lines energized between the transparent interdigitated electrode pattern 30 by the lateral electric field applied by the control signal 50.

However, a splay bend defect wall (sometimes refer to as a Helfrich wall) and a line disclination 42 will form at the center between two electrodes 30. The grating structure can be observed by placing the liquid crystal cell or electro-optic polarizor 10 between crossed polarizers in a polarizing microscope as shown in the photomicrograph of FIG. 5.

Figure 5:
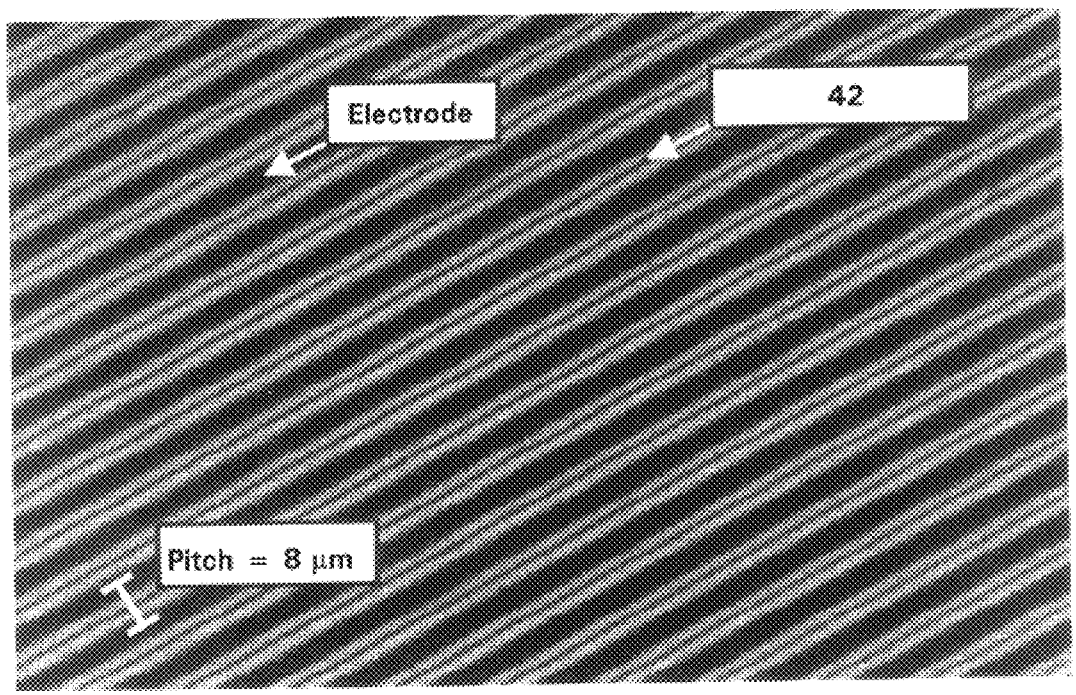
FIG. 5 is a photomicrograph of the line disclination 42 formed from the electric field application of FIG. 4.
Figure 6:
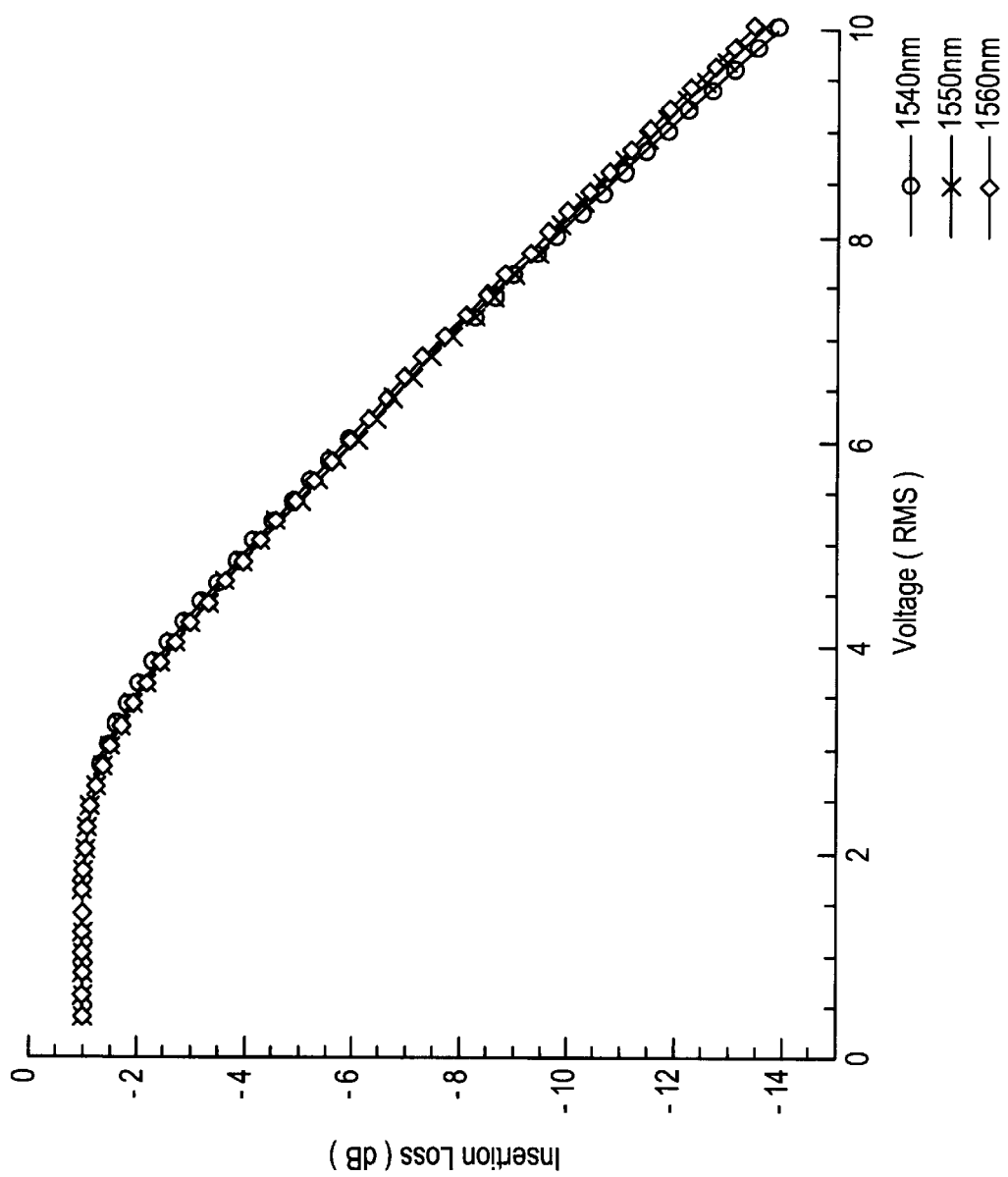
FIG. 6 is a graph of the insertion loss for various incident readout beam angles of FIG. 4.

Referring to FIG. 6, the attenuation capability of the grating formed by the cell 10 is illustrated by the insertion loss results of a zero order beam versus applied RMS voltage on the exemplary LC grating cell 10 with an 8 um pitch of FIG. 5.

Figure 7:
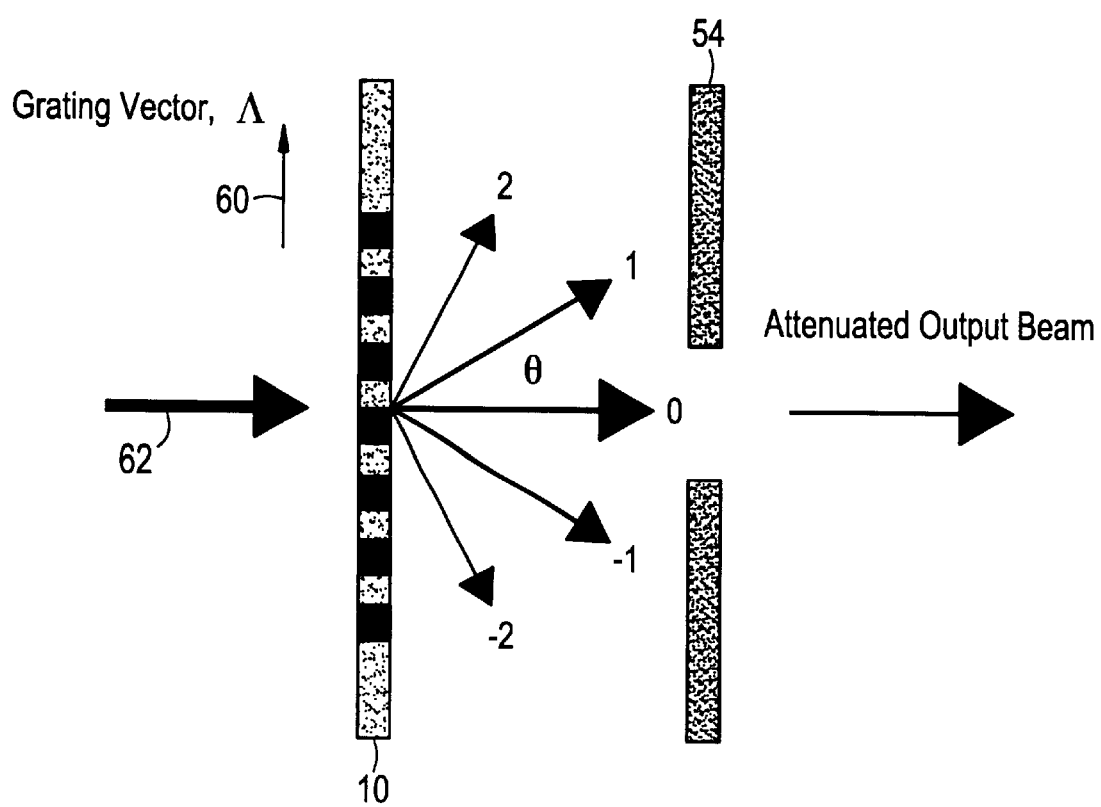
FIG. 7 is a representation of the cell 10 of FIG. 1 being filtered, in accordance with the teachings of the present invention.

The basic operation of and theory behind a grating-based VOA, according to the teachings of the present invention, involves diffraction of the thin phase grating of FIG. 1 after filtering as shown in FIG. 7. Basic operational details of the diffractive optical properties of these gratings are known. Light incident on a grating is diffracted into multiple orders. These orders are distinguished by the numbers 0, ±1, ±2, ±3, . . . , ±m which correspond to their respective propagation angles of 0, ±1θ, ±2θ, ±3θ, . . . , ±mθ. The diffraction angle, θ, can be calculated from the grating vector, Λ, through the Bragg condition or equation:

$$\sin\frac{\theta}{2} = \frac{\lambda}{2|\Lambda|}$$

in which λ is the wavelength of incident light. It is clear from the Bragg equation that higher resolution gratings (i.e. small |Λ|) provide larger diffraction angles resulting in a more rapid spread of the orders. Once the orders spatially separate, an aperture or another type of spatial filter, such as a hologram or a prism 54 can be inserted into the beam of light to filter all orders except the zero order or main beam. If the desired distance is reached, a spatial filter is not necessary. The minimum distance between the filter and the grating is determined by the beam diameter, w, and the diffraction angle:

$$d \geq \frac{w}{\tan\theta}.$$

The insertion loss of the zero order, defined as the ratio of the optical power in the zero order to the total incident power, is equivalent to the attenuation constant, k, or variable attenuation coefficient. The insertion loss is thus a function of the grating profile and the grating strength. For example, take the case of a phase profile, Δφ(x), that is sinusoidal and given by:

$$\Delta\phi = \delta\cos\left(\frac{x}{\Lambda}\right)$$

in which the grating strength is given by $$\delta = \frac{2\pi \Delta n L}{\lambda}$$

where L is the film thickness and Δn is the maximum index change. The diffraction efficiency of the mth order is given by $$\eta_m = \frac{P_m}{P_{total}} = J_m^2(\delta)$$

in which $J_m(\delta)$ is a Bessel function. For the zero order (m=0), the diffraction efficiency, also known as insertion loss, $\eta_0$, monotonically decreases from 1 to 0 as the grating strength increases from δ=0 to δ=2.6. By controlling the grating strength, one can control the insertion loss of the zero order beam and thus control the attenuation of the main beam.

The cell 10 of FIG. 1 can be applied to form a polarization independent liquid crystal based VOA that uses lateral field based liquid crystal gratings. Such an inventive VOA requires no separate pair of polarizers and has a number of attractive features compared to traditional passive liquid crystal (LC) devices.

Several key advantages exist for using a lateral field based or nematic liquid crystal gratings versus traditional passive LC devices that use transverse fields. As is known in the art, a lateral field means that the electric field lines begin and end on the same substrate or glass plate 22 in this example provided by the nematic nature of the liquid crystal.

Lateral field based devices that utilize the fringing field are not limited by the LC film thickness. The resolution is limited only by the photolithographic process used to fabricate the interdigitated electrodes 30. For example, fabricating and testing phase gratings with grating periods as small as 0.8 μm can be achieved with lateral field based devices.

The alignment needed for the lateral field device can be homeotropic rather than homogeneous as is needed in traditional passive LC devices. Thus, a simple dip coating of a surfactant is needed rather than the more complex rubbing process.

Since the applied electrode voltage 50 of FIG. 1 controls the depth penetration of the electric field into the LC film 40, the tolerances on requisite film thickness for phase gratings in the lateral field device is less stringent.

Lateral field devices are less sensitive to temperature variations.

Furthermore, the formation of the defect wall 42 in FIG. 5 in the lateral field devices improves response time of the cell.

The liquid crystal phase grating cell 10 of FIG. 1 is advantageously used to diffract light to create variable transmission. For polarization insensitivity, two such grating cells 10 are preferably used in a transmissive configuration. Because the lateral field based liquid crystal grating diffracts light of only one of the two eigenpolarization states of optical beam as seen in FIG. 3, two identical LC gratings of two cells 10, placed functionally arranged orthogonal to each other, are needed to form a VOA which removes polarization dependent losses. The schematic for two possible implementations are shown in FIGS. 8 and 9.

Figure 8:
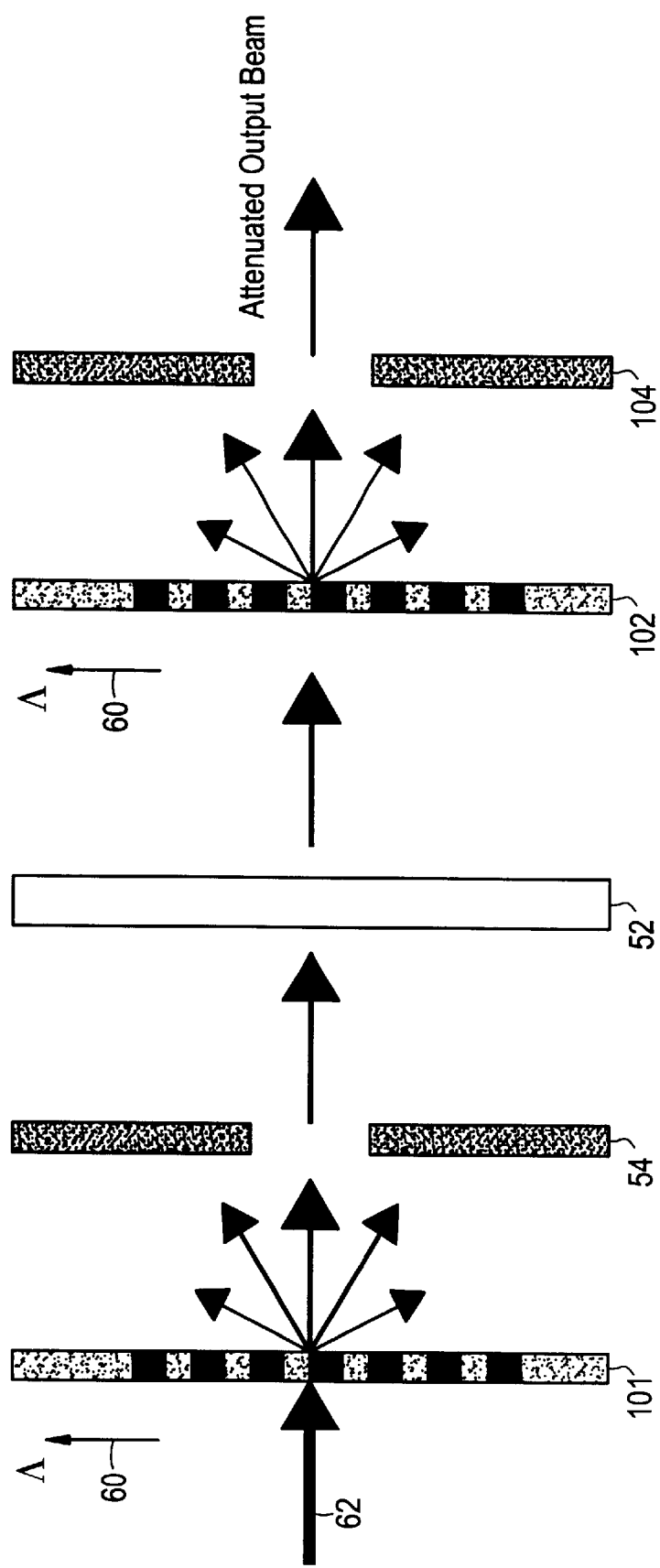
FIG. 8 is a first VOA embodiment using the liquid crystal grating cells 10 of FIG. 1 in a transmissive configuration to provide parallel grating vectors, in accordance with the teachings of the present invention.
Figure 9:
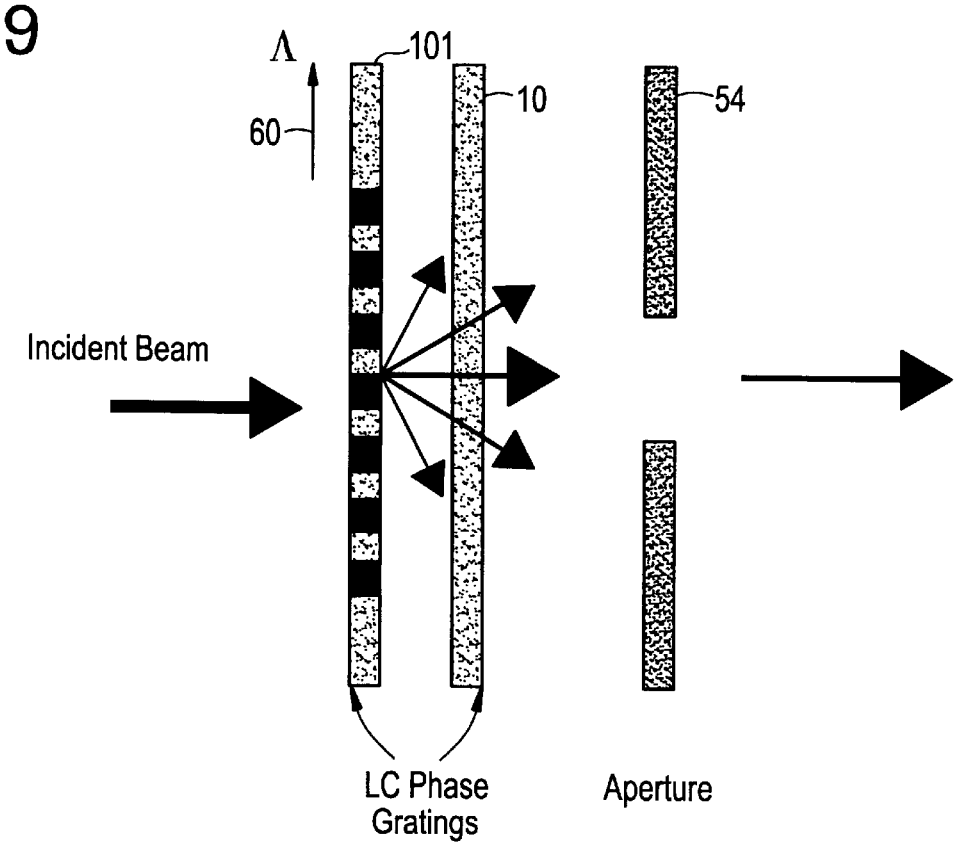
FIG. 9 is a top view of a second VOA embodiment using the liquid crystal grating cells 10 of FIG. 1 in a transmissive configuration to provide orthogonal grating vectors, in accordance with the teachings of the present invention.

Referring to FIG. 8, a halfwave transparent plate 52 to orthogonally switch the grating vector is sandwiched between two lateral field based liquid crystal grating 101 and 102 formed by cells 10 of FIG. 1 with two exit apertured layers 54 and 104 for spatial filtering of the incident beam 62. The apertured layer 54 or 104 is one type of an optical beam selector simply implemented as a hole in a glass plate. The apertured layer or any other type of an optical beam selector is placed a distance away from the transparent interdigitated electrode pattern 30 such that the optical beam selector filters all undesired orders of light diffracted from the transparent interdigitated electrode pattern. Filtering of the light is achieved by first determining a desired distance from the thin phase lateral field based liquid crystal grating or cell where the multiple orders of light spatially separate from each other according to the Bragg condition. The optical beam selector, in the form of a spatial filter, such as the apertured layer 54 is placed at this predetermined distance. The apertured layer 54 is made from a layer of light absorbing material. An aperture is formed through the layer of the light absorbing material perpendicular to the would-be path of the light incident on the thin phase lateral field based liquid crystal grating 10 and placed away from the cell such that only the desired order of light passes through the aperture.

The grating vector 60 of the LC components or cells 101 and 102 must be parallel to each other for the halfwave plate 52 to orthogonally align the first cell 101. The linear polarization component parallel to the grating vector 60 or the extraordinary ray 66 of an incoming optical beam is diffracted into many orders. As seen in FIG. 6, the insertion loss is a function of the grating strength which is controlled by the applied ac electric field controlled by the control signal 50. The linear polarization component perpendicular to the grating vector 60 or the ordinary ray 64 is unaffected by the grating structure formed by the "unseen" or non-varying electrode pattern when looking at the long sections versus the short sections of the interdigitated electrode pattern 30. Once the extraordinary ray of the beam 62 propagates through each of the grating cells 101 and 102, an aperture in the each of the apertured layers 54 and 104 filters all higher orders of the beam allowing only the zero order or main beam to pass, thereby attenuating all other orders such that the overall light intensity of the output beam is attenuated.

As previously stated and described in more detail, the function of the halfwave plate 52 is to rotate the polarization state such that the linear orthogonal polarization components are interchanged. The polarization component parallel to the grating vector 60 becomes perpendicular and the polarization component perpendicular to the grating vector 60 becomes parallel. Thus, when the beam 62 propagates through the second LC grating cell 102, the light of the orthogonal component to initially diffracted light is now diffracted into many orders. The second aperture 104 also filters all higher orders allowing only the zero order (main beam) to propagate through.

Figure 10:
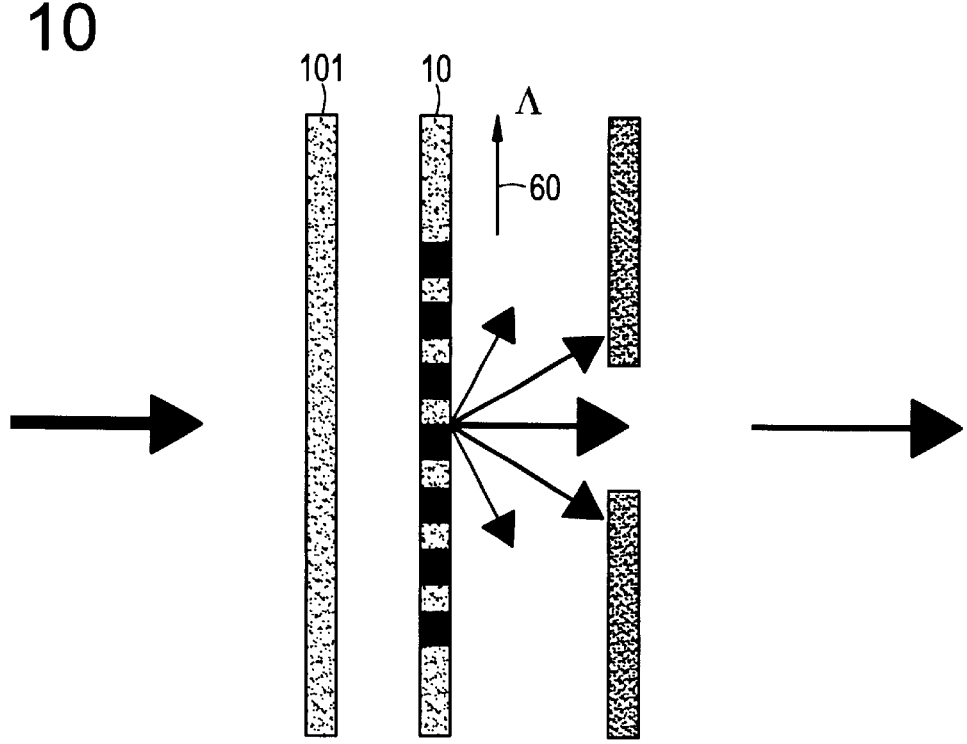
FIG. 10 is a side view of the second VOA embodiment of FIG. 9, in accordance with the teachings of the present invention.

Referring to FIGS. 9 and 10, an alternate embodiment of the invention is shown. Two identical LC grating cells 101 and 10, as taught in FIG. 1, are simply followed by a single aperture 54. In this case, the grating vectors 60 must be orthogonally formed by placing one cell 10 orthogonal to the other, in order to diffract both polarization components and thus, minimize polarization dependent loss. The aperture 54 is used to filter all higher order diffraction spots allowing only the zero order beam to propagate as in the halfwave plate case.

In both cases, the attenuation coefficient, k, is directly determined by the insertion loss (FIG. 6) of the gratings. If greater attenuation is required, multiple attenuation grating cells can be cascaded or arrayed.

Figure 11:
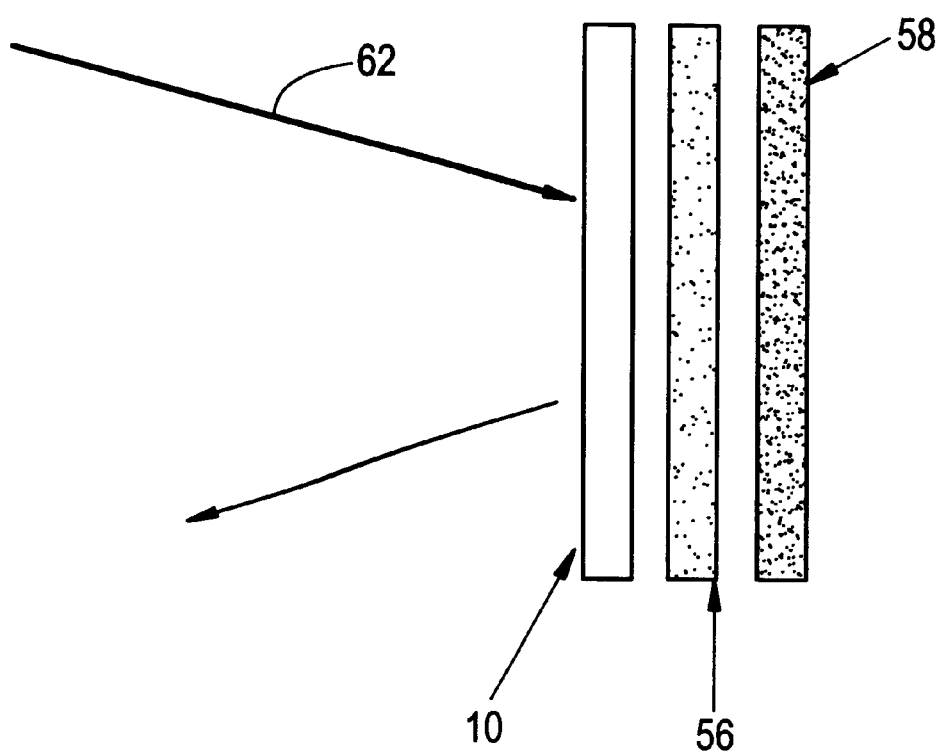
FIG. 11 is a third VOA embodiment using the liquid crystal grating cell 10 of FIG. 1 in a reflective configuration, in accordance with the teachings of the present invention.

Referring to FIG. 11, a third VOA embodiment using the liquid crystal grating cell 10 of FIG. 1 in a reflective configuration is illustrated as a side view. A quarterwave transparent or transmissive plate 56 to orthogonally switch the grating vector from the incoming beam 62 that is reflected from a mirror 58 is sandwiched between one lateral field based liquid crystal grating cell 10 of FIG. 1 and the mirror 58. The quarterwave plate provides a duplicate version of the first liquid crystal phase grating assembly or cell 10. The mirror 58 placed a predetermined distance away from the quarterwave plate 56, thereby not needing a spatial filter assuming the distance is precise, provides the same function as the halfwave plate 52 of FIG. 8 to allow the same attenuated output beam of FIG. 8 but reflected from the mirror 58 and through the single cell 10, instead of using two parallel cells of FIG. 8.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electro-optic polarizor comprising:

a first glass plate;

a first alignment surfactant coated on one surface of the first glass plate;

a second glass plate;

a second alignment surfactant coated on one surface of the second glass plate;

a transparent interdigitated electrode pattern disposed between the second glass plate and the second alignment surfactant;

a thin film of homeotropically aligned nematic liquid crystal sandwiched between the first and second alignment surfactants for applying a lateral electric field across the liquid crystal to alter the optical properties of the liquid crystal such that a polarization dependent grating is induced by the lateral electric field; and an optical beam selector placed a distance away from the transparent interdigitated electrode pattern such that the optical beam selector filters all non-zero orders of light diffracted from the transparent interdigitated electrode pattern for allowing only the zero order to pass, thereby attenuating all non-zero orders such that the overall light intensity is attenuated.

2. The electro-optic polarizor of claim 1 wherein the thin film of homeotropically aligned nematic liquid crystal comprises rod-shaped molecules that rotate from the homeotropically aligned position of being perpendicular to the first and second alignment surfactants to a geometry that follows the lateral electrostatic field lines energized by a control signal between the transparent interdigitated electrode pattern by the lateral electric field of only one of two eigenpolarization states of an incident non-polarized light beam.

3. The electro-optic polarizor of claim 2 wherein the optical beam selector filters all non-zero orders of light diffracted as a function of grating strength controlled by the depth of penetration of the lateral electric field applied by the RMS voltage of the control signal such that the amount of attenuation of the non-zero orders is controlled by the grating strength.

4. The electro-optic polarizor of claim 1 placed in a slanted array to form a dynamic gain flattening filter.

5. The electro-optic polarizor of claim 1 wherein optical beam selector comprises a distance separator placed the distance away from the transparent interdigitated electrode pattern for selecting the zero order of light from the multiple orders of light spatially separate from the polarization dependent grating.

6. The electro-optic polarizor of claim 3 wherein the optical beam selector filters all non-zero orders of only one of two eigenpolarization states of the incident non-polarized light beam at a time.

7. The electro-optic polarizor of claim 1 wherein the optical beam selector comprises a spatial filter.

8. The electro-optic polarizor of claim 3 wherein the optical beam selector comprises a layer of light absorbing material having an aperture through the layer of light absorbing material perpendicular to the path of only one of two eigenpolarization states of the incident non-polarized light beam such that only the zero order of light passes through the aperture with a diffraction efficiency equal to the insertion loss which is controlled by the grating strength for controlling the attenuation of one of two eigenpolarization states of the incident non-polarized light beam.

9. The electro-optic polarizor of claim 3 comprises a first liquid crystal phase grating assembly for diffracting light of multiple orders of a first eigenpolarization state of the incident non-polarized optical beam.

10. The electro-optic polarizor of claim 9 wherein the electro-optic polarizor comprises a second liquid crystal phase grating assembly for diffracting light of multiple orders of a second eigenpolarization state of the incident non-polarized optical beam.

11. A variable optical attenuator comprises:

a first liquid crystal phase grating assembly having a homeotropically aligned nematic liquid crystal for applying a lateral electric field across to alter the properties that a grating is induced by the lateral field for diffracting light of multiple orders of a first eigenpolarization state of an incident optical beam; and a second liquid crystal phase grating assembly for diffracting light of multiple orders of a second eigenpolarization state of the incident optical beam wherein the second liquid crystal phase grating assembly comprises a quarterwave plate to provide a duplicate version of the first liquid crystal phase grating assembly; and a mirror placed a predetermined distance away from the quarterwave plate to provide a duplicate and orthogonal version of the first liquid crystal phase grating assembly.

12. The electro-optic polarizor of claim 10 wherein the second grating assembly is optically coupled to the first grating assembly in an orthogonal transmissive configuration to form a variable optical attenuator.

13. A variable optical attenuator comprises:

a first liquid crystal phase grating assembly having a homeotropically aligned nematic liquid crystal for applying a lateral electric field across to alter the properties that a grating is induced by the lateral field for diffracting light of multiple orders of a first eigenpolarization state of an incident optical beam; and a second liquid crystal phase grating assembly for diffracting light of multiple orders of a second eigenpolarization state of the incident optical beam wherein the second grating assembly is optically coupled to the first grating assembly in a parallel transmissive configuration by a halfwave transmissive plate inserted between the two assemblies.

* * * * *